(12) United States Patent
Bilgen et al.

(10) Patent No.: US 9,088,728 B2
(45) Date of Patent: Jul. 21, 2015

(54) GESTURE RESPONSIVE IMAGE CAPTURE CONTROL AND/OR OPERATION ON IMAGE

(75) Inventors: Aras Bilgen, Istanbul (TR); Sean V. Kelley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 36 days.

(21) Appl. No.: 13/997,135

(22) PCT Filed: May 10, 2012

(86) PCT No.: PCT/US2012/037388
§ 371 (c)(1),
(2), (4) Date: Jun. 21, 2013

(87) PCT Pub. No.: WO2013/169259
PCT Pub. Date: Nov. 14, 2013

(65) Prior Publication Data
US 2014/0204247 A1    Jul. 24, 2014

(51) Int. Cl.
H04N 5/232 (2006.01)
H04N 5/262 (2006.01)
G06F 3/0488 (2013.01)

(52) U.S. Cl.
CPC .......... *H04N 5/2628* (2013.01); *G06F 3/04883* (2013.01); *H04N 5/23216* (2013.01); *H04N 5/23296* (2013.01); *H04N 5/23293* (2013.01)

(58) Field of Classification Search
CPC .......... H04N 5/23216; H04N 5/23219; H04N 1/2125; G03B 37/04
USPC ........... 348/14.03, 184, 240.2, 222.1, 333.01, 348/FOR. 164
See application file for complete search history.

(56) References Cited

U.S. PATENT DOCUMENTS

| 2006/0026521 | A1 | 2/2006 | Hotelling et al. |
| 2009/0309997 | A1 | 12/2009 | Hunt et al. |
| 2010/0315438 | A1* | 12/2010 | Horodezky et al. .......... 345/661 |
| 2011/0013049 | A1 | 1/2011 | Thorn |
| 2011/0043662 | A1* | 2/2011 | Kim .......................... 348/240.2 |
| 2011/0228155 | A1* | 9/2011 | Lee et al. ................. 348/333.01 |

(Continued)

FOREIGN PATENT DOCUMENTS

| TW | 201137716 A1 | 11/2011 |
| WO | WO2007-000743 A2 | 1/2007 |

OTHER PUBLICATIONS

International Search Report and Written Opinion mailed Feb. 22, 2013 for International Application No. PCT/US2012/037388, 13 pages.

(Continued)

*Primary Examiner* — Hung Lam
(74) *Attorney, Agent, or Firm* — Schwabe, Williamson & Wyatt, P.C.

(57) ABSTRACT

Methods, apparatuses and storage medium associated with controlling capture of images and/or processing captured images are disclosed herein. In embodiments, a storage medium may include instructions configured to enable a device having an image capture component, in response to execution of the instructions by the device, to enable the device to provide one or more sendees to control the image capture component responsive to a gesture, to perform a post-capture processing operation on an image captured by the image capture component responsive to the gesture, or to do both.

16 Claims, 4 Drawing Sheets

(56) References Cited

U.S. PATENT DOCUMENTS

| | | | |
|---|---|---|---|
| 2011/0261213 A1 | 10/2011 | Rottler et al. | |
| 2012/0092457 A1* | 4/2012 | Sugino et al. | 348/46 |
| 2012/0218289 A1* | 8/2012 | Rasmussen et al. | 345/619 |
| 2012/0274597 A1* | 11/2012 | Forstall et al. | 345/173 |
| 2013/0050109 A1* | 2/2013 | Ban | 345/173 |
| 2013/0120279 A1* | 5/2013 | Plichta et al. | 345/173 |
| 2013/0147848 A1* | 6/2013 | Takahashi et al. | 345/660 |
| 2013/0278552 A1* | 10/2013 | Kamin-Lyndgaard | 345/174 |
| 2014/0111456 A1* | 4/2014 | Kashiwa et al. | 345/173 |

OTHER PUBLICATIONS

International Preliminary Report on Patentability mailed Nov. 20, 2014 for International Application No. PCT/US2012/037388, 6 pages.

Office Action mailed Dec. 1, 2014 for Taiwan Patent Application No. 10211428, 5 pages.

Office Action mailed Mar. 24, 2015 for Taiwan Application No. 102114248; 18 pages.

\* cited by examiner

GESTURE RESPONSIVE IMAGE CAPTURE CONTROL AND/OR OPERATION ON IMAGE

CROSS REFERENCE TO RELATED APPLICATIONS

The present application is a national phase entry under 35 U.S.C. §371 of International Application No. PCT/US2012/037388, filed May 10, 2012, entitled "GESTURE RESPONSIVE IMAGE CAPTURE CONTROL AND/OR OPERATION ON IMAGE", which designated, among the various States, the United States of America. The Specification of the PCT/US2012/037388 Application is hereby incorporated by reference.

TECHNICAL FIELD

This application relates to the technical field of imaging, more specifically to methods and apparatuses associated with gesture responsive image capture control and/or operation on a captured image.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In recent years, digital cameras, from the low-end ultra compact cameras to the high-end professional single-lens reflex (SLR) cameras, have all seen major technological advances, e.g., higher resolution image sensors, better focus metering, and so forth. A number of these advances have also found their way into mobile devices, such as smartphones. Today, photo capturing, viewing and sharing are major usage scenarios of mobile devices. Many mobile devices allow for very compelling user friendly interactions with captured images. Users can zoom in on captured images with their fingers, flick through huge image collections quickly, and manipulate the images using gestures. However, such compelling user friendly interactions are typically limited to captured image viewing on mobile devices.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Methods, apparatuses and storage medium associated with gesture response image capture control and/or operation on images are described herein.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Figure 1:
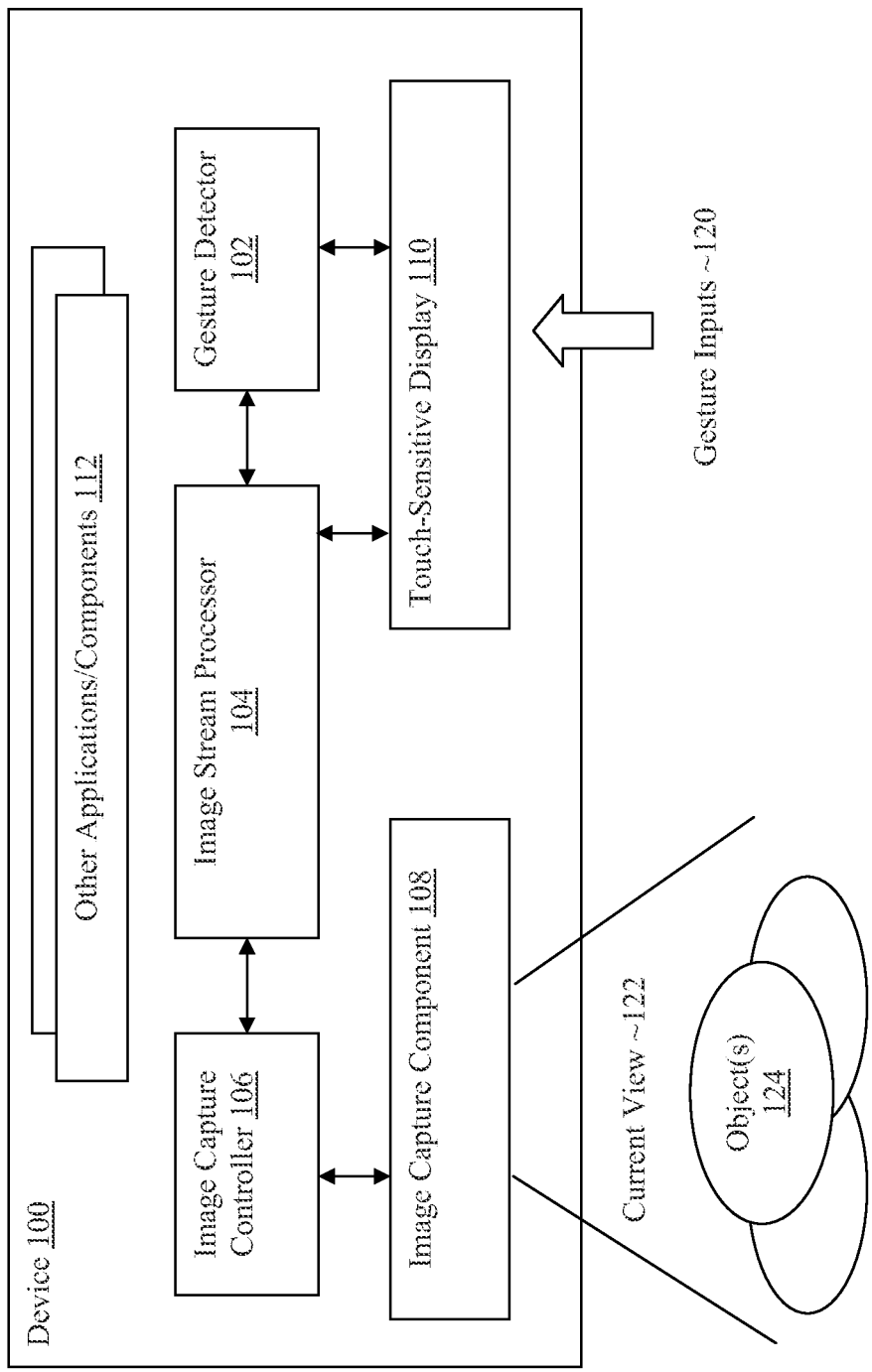
FIG. 1 illustrates an example image capturing device equipped with gesture responsive image capture control and/or operation on captured images.

FIG. 1 illustrates an example image capturing device equipped with gesture response image capture control and/or operation on images, in accordance with various embodiments of the present disclosure. As illustrated, embodiments of device 100 may include gesture detector 102, image stream processor 104, image capture controller 106, image capture component 108 and touch-sensitive display 110, coupled with one another as shown. Collectively, these elements may enable a user of device 100 to control one or more image capture settings of image capture component 108, and/or having one or more operations performed on images captured by image capture component 108, using gestures 120 inputted through, e.g., touch-sensitive display 110.

An example of image capture setting may include, but is not limited to, a zoom setting. An example of operations on images truly include, but is not limited to, a cropping operation.

In embodiments, gesture detector 102 may be configured to receive gestures 120, and in response, map gestures 120 to a control setting for image capture component 108, and/or an operation to be performed on an image captured by image capture component 108. In embodiments, gestures 120 may be a pinch gesture inputted, e.g., through touch-sensitive display 110. More specifically, gesture detector 102 may map the finger span of the pinch gesture to a zoom setting for image capture component 108. Additionally or alternatively, gesture detector 102 may also map the center of the finger span of the pinch gesture to a cropping operation to be performed on an image captured by image capture component 108. In embodiments, gesture detector 102 may be configured with storage medium, e.g., non-volatile memory, to store a table of mappings. In embodiments, gesture detector 102 may be configured with interface and logic to facilitate registration of these mappings programmatically or by a user. Gesture detector 102 may be implemented in hardware or software, or both (combination).

Figure 3:
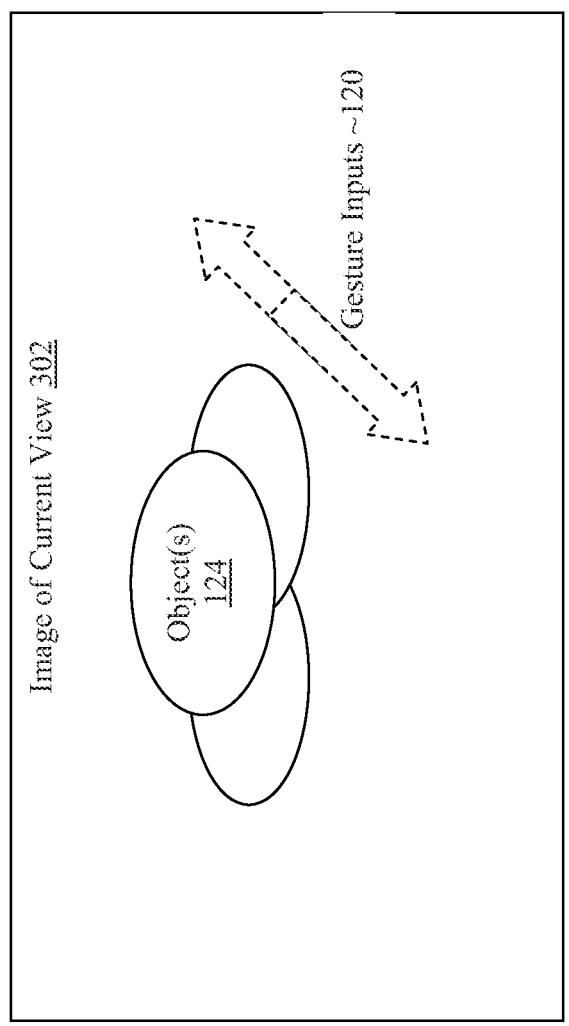
FIG. 3 illustrates an example image of a current view for a user to gesture control and/or image operation.

In embodiments, image stream processor 104 may be configured to present an image of a current view 122 as seen by image capture component 108 for display on touch-sensitive display 110, for a user to interact, e.g., through gesture detector 102. In embodiments, as described earlier, the interactions may include, but are not limited to, gesturing control setting for image capture component 108, and/or gesturing operations to be performed on a captured image. In embodiments, for the former types of interactions, image stream processor 104 may be configured to forward the gestured control setting to image capture controller 106. For the latter types of interactions, image stream processor 104 may be configured to perform the gestured operation on the presented image, after capture. In embodiments, image stream processor 104 may be implemented in hardware or software, or both (combination), FIG. 3 illustrates an example image 302 of current view 122 of objects 124 for a user to gesture 120 image capture controls and/or operations on captured images.

Referring back to FIG. 1, in embodiments, image capture controller 106 may be configured to control image capture component 108, including controlling operations as well as operational settings of image capture component 108. In embodiments, image capture controller 106 may be configured to change the control sating of image capture component 108, in response to the control setting information/commands forwarded from image stream processor 104, including the gestured control setting image stream processor 104 forwards on behalf of gesture detector 102. In embodiments, image capture controller 106 may be implemented in hardware or software, or both (combination).

In embodiments, image capture component 108 may include various optics and/or sensor components configured to provide a current view 122 of the environment external to device 100. The environment may include a number of objects 124 of interest, e.g., people, building, geographic features and so forth. Touch-sensitive display 110 may be configured to display an image of the current view, and facilitate user interactions with user interface elements and forwarding the user interactions to appropriate drivers or handlers of device 100 to process, including forwarding user gestures to gesture detector 102, as described earlier. In embodiments, image capture component 108 and touch-sensitive display 110 represent a broad range of these elements known in the art.

As described earlier, gesture detector 102, image stream processor 104 and image capture controller 106 may be implemented in hardware, software, or both (combination). In embodiments, one or more of gesture detector 102, image stream processor 104 and image capture controller 106 may be implemented with programming instructions configured to be executed by a processor (not shown) of device 100. The processor may be any one of a wide range of digital signal processors, graphics processors, or general purpose microprocessors, known in the art.

Examples of device 100 may include, but are not limited to, ultra compact cameras, point-and-shoot cameras, compact SLR cameras, medium SLR cameras, professional SLR cameras, smartphones, personal digital assistants, computing tablets, laptop computers, and so forth. Accordingly, in embodiments, device 100 may include other applications and/or components 112. For examples, in the case of cameras, other applications and/or components 112 may include other photography related applications and/or components. In the case of smartphones, other applications and/or components 112 may, e.g., include telephony related applications and/or components. In the case of computing tablets, other applications and/or components 112 may, e.g., include wireless communication applications and/or components.

Figure 2:
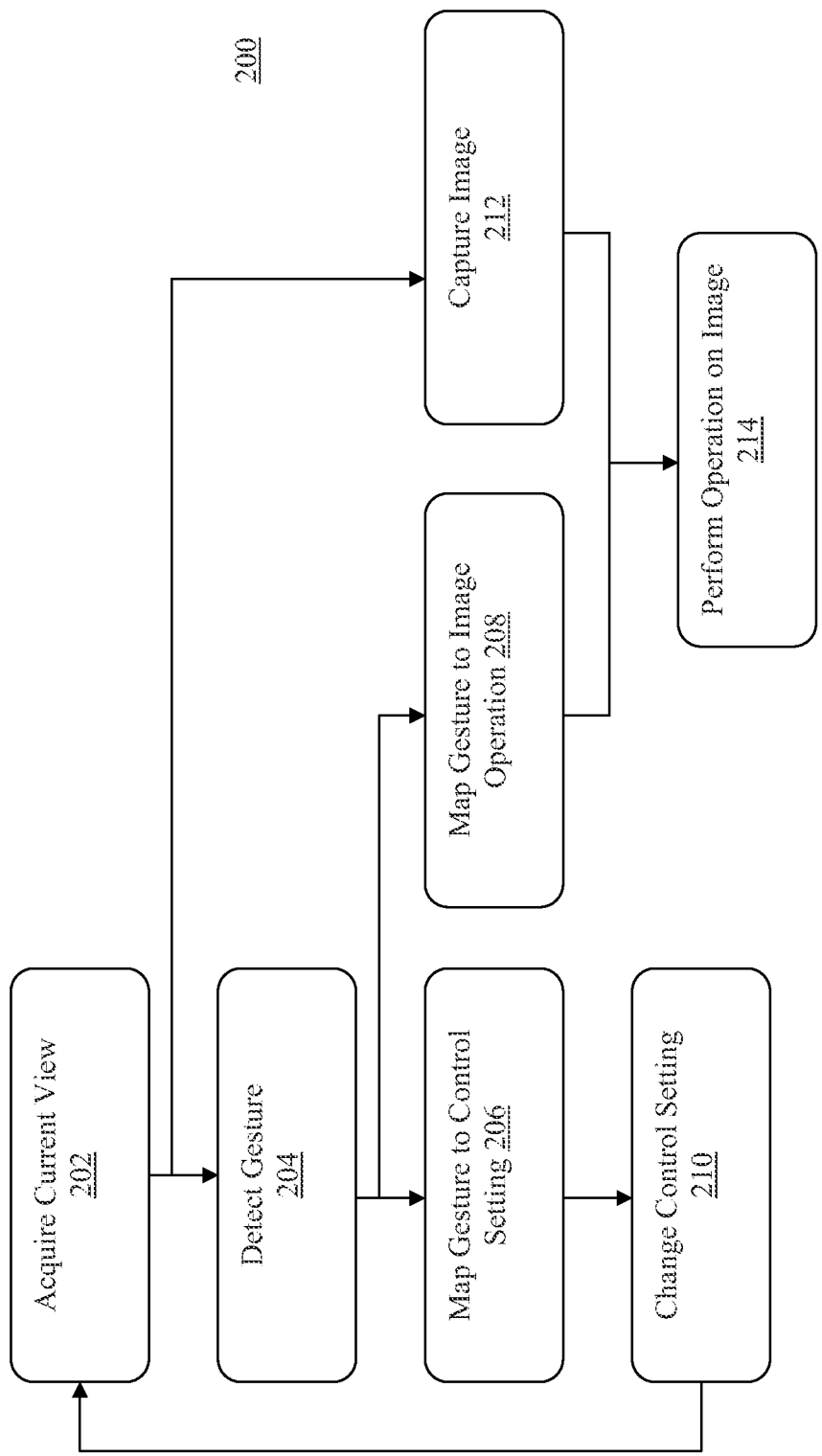
FIG. 2 illustrates an imaging method using the image capturing device of FIG. 1.

Referring now to FIG. 2, wherein an imaging method, in accordance with various embodiments of the present disclosure, is illustrated. As shown, method 200 may start at block 202. At block 202, device 100 may be positioned and/or pointed in a particular direction to acquire a current view of the external environment, e.g., by a user of device 100 or using a positioning device (not shown). In response, an image of the current view for a user of device 100 to interact may be displayed (e.g., by image stream processor 104).

From block 202, method 200 may proceed to block 204 or block 212. At block 204, a user or a machine may interact with the displayed image, including making gestures relative to the displayed image, e.g., a pinch gesture. The gestures may be detected, e.g., by gesture detector 102. Block 212 will be further described later.

From block 204, method 200 may proceed to block 206 and/or block 208. At blocks 206 and/or 208, the gestures may be mapped to a control setting for image capture component 108 or to an operation to be performed on the captured image of the current view. The mapping, e.g., may be performed by gesture detector 102, including using, e.g., a table of registered mappings.

From block 206, the method may proceed to block 210. At block 210, after a gesture is mapped to a control setting for image capture component 108, the control setting may be changed or re-configured (e.g., by image capture controller 106). At block 212, an image of the current view may be captured. The image may be captured, e.g., by image capture component 108, in response to a capture instruction from a user or a machine.

From blocks 208 and 212, method 200 may proceed to block 214. At block 214, an image processing operation may be performed on the captured image (e.g., by image stream processor 104). The imaging processing operation may, e.g., be a mapped cropping operation, in accordance with a gesture.

Accordingly, embodiments of the present disclosure advantageously enable two primary operations for capturing an image, zooming and framing, to be fused into a single, easy-to-understand operation during viewing. As those of ordinary skill in the art would appreciate isolating an area of interest with a current view, and properly framing the scene are primary activities in capturing images. Current camera subsystems do not offer user friendly features to enable these activities to be performed together. Typically, these activities are performed separately.

Figure 4:
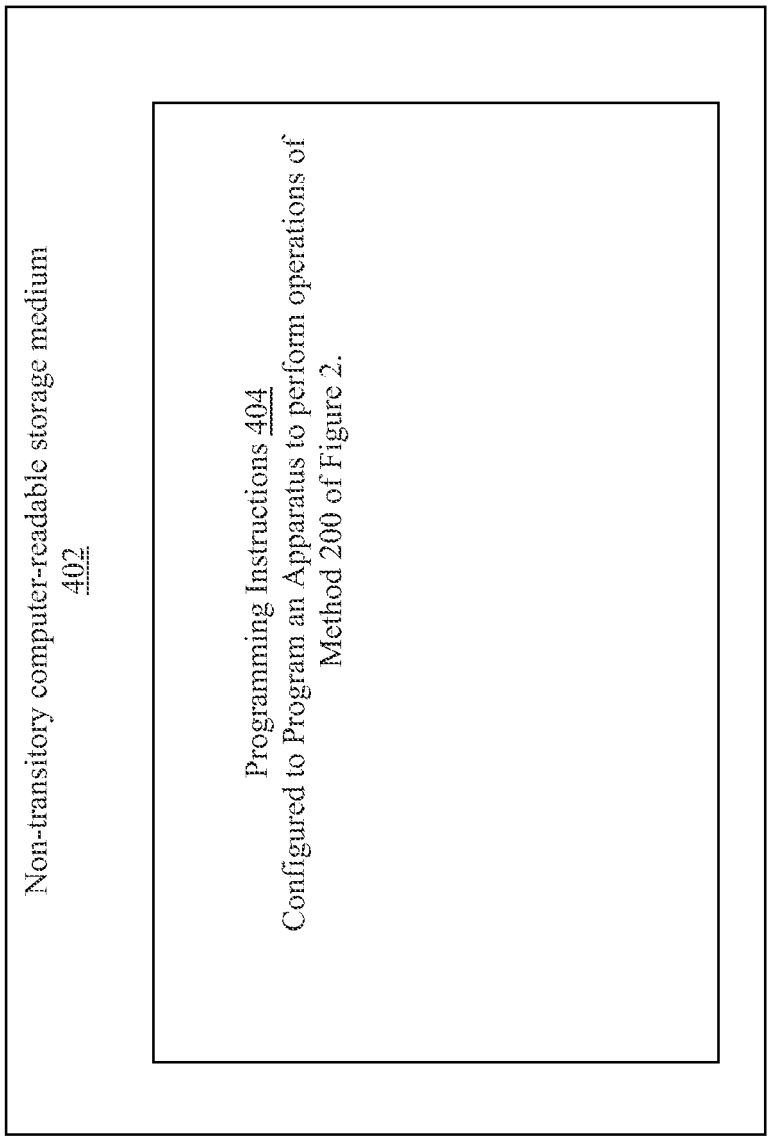
FIG. 4 illustrates an example non-transitory computer-readable storage medium having instructions configured to enable practice of all or selected aspects of the method of FIG. 2; all arranged in accordance with embodiments of the present disclosure.

FIG. 4 illustrates an example non-transitory computer-readable storage medium having instructions configured to enable practice of all or selected aspects of the method of FIG. 2; in accordance with various embodiments of the present disclosure. As illustrated, non-transitory computer-readable storage medium 402 may include a number of programming instructions 404. Programming instructions 404 may be configured to enable a device, e.g., device 100 (embodiments with appropriate processors), (in response to execution of the programming instructions) to perform the device related operations of method 200, earlier described with references to FIG. 2. In alternate embodiments, programming instructions 404 may be disposed on multiple non-transitory computer-readable storage media 402 instead. In various embodiments, the programming instructions may be configured to implement gesture detector 102, image stream processor 104, and/or image capture controller 106.

For some of these embodiments, at least one of the processor(s) may be packaged together with programming instructions 404 to practice some or all aspects of method 200. For some of these embodiments, at least one of the processor(s) may be packaged together with programming instructions 404 to practice some or all aspects of method 200 to form a System in Package (SiP). For some of these embodiments, at least one of the processor(s) may be integrated on the same die with programming instructions 404 to practice some or all aspects of method 200. For some of these embodiments, at least one of the processor(s) may be integrated on the same die with programming instructions 404 to practice some or all aspects of method 200 to form a System on Chip (SoC). For at least one embodiment, the SoC may be utilized in a smartphone, cell phone, tablet, or other mobile device.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims thereof.

In embodiments, at least one non-transitory computer-readable storage medium is provided with a plurality of instructions configured to enable a device having an image capture component, in response to execution of the instructions by the device, to enable the device to provide one or more services to control a setting of the image capture component responsive to a gesture, to perform a post-capture processing operation on an image captured by the image capture component responsive to the gesture, or to do both.

In embodiments, the one or more services to control a setting of the image capture component include one or more services to control a zoom factor of the image capture component responsive to the gesture. In embodiments, the one or more services to control a zoom factor of the image capture component is configured to control the zoom factor responsive to a finger span of a pinch gesture. In embodiments, the one or more services to perform a post-capture processing operation on an image captured by the image capture component include one or more services to crop an image captured by the image capture component responsive to the gesture. In embodiments, the one or more services to crop an image captured by the image capture component is configured to crop an image captured by the image capture component responsive to a center of a finger span of a pinch gesture.

In embodiments, a method for operating a device having an image capture component, includes receiving, by the device, input of a gesture; and controlling a setting of the image capture component responsive to the gesture, performing a post-capture processing operation on an image captured by the image capture component responsive to the gesture, or doing both.

In embodiments, controlling a setting of the image capture component includes controlling a zoom factor of the image capture component responsive to the gesture. In embodiments, controlling a zoom factor of the image capture component comprises controlling the zoom factor responsive to a finger span of a pinch gesture. In embodiments, performing a post-capture processing operation on an image captured by the image capture component includes cropping an image captured by the image capture component responsive to the gesture. In embodiments, cropping an image captured by the image capture component comprises cropping an image captured by the image capture component responsive to a center of a finger span of a pinch gesture.

In embodiments, an apparatus for imaging includes an image capture component configured to capture an image; and one or more logic units coupled with the image capture component, and configured to control the image capture component responsive to a gesture, perform a post-capture processing operation on an image captured by the image capture component responsive to the gesture, or do both.

In embodiments, the one or more logic units are configured to control a setting of the image capture component responsive to a gesture. In embodiments, the one or more logic units are configured to control a zoom factor of the image capture component responsive to the gesture. In embodiments, the one or more logic units are configured to control the zoom factor responsive to a finger span of a pinch gesture. In embodiments, the one or more logic units are configured to crop an image captured by the image capture component responsive to the gesture. In embodiments, the one or more logic units is configured to crop an image captured by the image capture component responsive to a center of a finger span of a pinch gesture.

In embodiments, the one or more logic units comprise a gesture detector configured to map a finger span of a pinch gesture to a zoom setting of the image capture component. In embodiments, the one or more logic units comprises a gesture detector configured to map a center of a finger span of a pinch gesture to a center of cropping for an image captured by the image capture component. In embodiments, the one or more logic units comprises an image stream processor coupled with the gesture detector, and configured to cooperate with the gesture detector to provide an image of a current view of the image capture component for a user of the device to use to gesture a control of the image capture component. In embodiments, the one or more logic units comprises an image stream processor coupled with gesture detector, and configured to cooperate with the gesture detector to provide an image of a current view of the image capture component for a user of the device to use to gesture an operation to be performed on an image captured by the image capture component. In embodiments, the image stream processor is configured to crop a first image captured by the image capture component in response to a gesture of a cropping operation to be performed on the first image. In embodiments, the one or more logic units further comprises an image capture controller coupled with the image stream processor, wherein the image capture controller is configured to provide the control to the image capture controller, and the image capture controller is configured to provide the control to the image capture component.

In embodiments, the apparatus is a selected one of a camera, a smartphone, a computing tablet, or a laptop computer.

What is claimed is:

1. At least one non-transitory computer-readable storage medium having a plurality of instructions to enable a device having an image capture component, in response to execution of the instructions by the device, to enable the device to provide one or more services to control a zoom setting of the image capture component responsive to a pinch gesture, that includes performance of a post-capture processing operation on an image captured by the image capture component;

wherein the one or more services to perform a post-capture processing operation on an image captured by the image capture component include one or more services to crop the image captured by the image capture component responsive to a center of a finger span of the pinch gesture.

2. The at least one non-transitory computer-readable storage medium of claim 1, wherein the one or more services to control a zoom to control the zoom setting responsive to a finger span of the pinch gesture.

3. The at least one non-transitory computer-readable storage medium of claim 2, wherein a center of the cropped image is determined responsive to the center of the finger span of the pinch gesture.

4. A method for operating a device having an image capture component, comprising:
   receiving, by the device, input of a pinch gesture; and
   controlling a zoom setting of the image capture component responsive to the pinch gesture, including performing a post-capture processing operation on an image captured by the image capture component; wherein performing a post-capture processing operation on an image captured by the image capture component includes cropping the image captured by the image capture component responsive to a center of a finger span of a pinch gesture.

5. The method of claim 4, wherein a center of the cropping of the image captured by the image capture component under control, is determined responsive to the center of the finger span of the pinch gesture.

6. An apparatus comprising:
   an image capture component to capture an image; and
   one or more logic units coupled with the image capture component, and to control a zoom setting of the image capture component responsive to a pinch gesture, that includes performance of a post-capture processing operation on an image captured by the image capture component;
   wherein the one or more logic units are to crop the image captured by the image capture component responsive to a center of a finger span of the pinch gesture.

7. The apparatus of claim 6, wherein the one or more logic units are to control the zoom setting responsive to a finger span of a pinch gesture.

8. The apparatus of claim 7, wherein the one or more logic units comprises a gesture detector to map the finger span of the pinch gesture to the zoom setting of the image capture component.

9. The apparatus of claim 6, wherein the one or more logic units comprises a gesture detector to map the center of the finger span of the pinch gesture to a center of cropping for the image captured by the image capture component.

10. The apparatus of claim 9, wherein the one or more logic units comprises an image stream processor coupled with the gesture detector, to cooperate with the gesture detector to provide an image of a current view of the image capture component for a user of the device to use to gesture a control of the image capture component.

11. The apparatus of claim 10, wherein the one or more logic units further comprises an image capture controller coupled with the image stream processor, wherein the image capture controller is to provide the control to the image capture component.

12. The apparatus of claim 11, wherein the apparatus is a selected one of a camera, a smartphone, a computing tablet, or a laptop computer.

13. The apparatus of claim 6, wherein the apparatus is a selected one of a camera, a smartphone, a computing tablet, or a laptop computer.

14. An apparatus comprising:
   an image capture component configured to capture an image;
   a gesture detector to map a pinch gesture to control a zoom setting of the image capture component, that includes a cropping operation to be performed on an image captured by the image capture component;
   an image stream processor coupled with gesture detector, to cooperate with the gesture detector to provide an image of a current view of the image capture component for a user of the device to use to pinch gesture the zoom setting; and
   an image capture controller coupled with the image stream processor, to provide the image stream processor with the current view, and to control the zoom setting of the image capture component responsive to the zoom setting provided by the image stream processor, wherein the image stream processor is further configured to provide the zoom setting to the image capture component responsive to a mapping to the zoom setting by the gesture detector response to a finger span of the pinch gesture;
   wherein the cropping operation is responsive to a center of the finger span of the pinch gesture.

15. The apparatus of claim 14, wherein the apparatus is a selected one of a camera, a smartphone, a computing tablet, or a laptop computer.

16. The apparatus of claim 14, wherein
   the gesture detector is to map a center of the finger span of the pinch gesture to a center of cropping for the image captured by the image capture component.

* * * * *